United States Patent
Zargar et al.

(10) Patent No.: US 12,229,253 B2
(45) Date of Patent: Feb. 18, 2025

(54) DEVICES AND METHODS TO SECURE A SYSTEM ON A CHIP

(71) Applicants: STMicroelectronics (Alps) SAS, Grenoble (FR); STMicroelectronics International N.V., Geneva (CH)

(72) Inventors: Asif Rashid Zargar, Greater Noida (IN); Gilles Eyzat, Claix (FR); Charul Jain, Delhi (IN)

(73) Assignees: STMicroelectronics International N.V., Geneva (CH); STMicroelectronics (Alps) SAS, Grenoble (FR)

( * ) Notice: Subject to any disclaimer, the term of this patent is extended or adjusted under 35 U.S.C. 154(b) by 245 days.

(21) Appl. No.: 17/340,164

(22) Filed: Jun. 7, 2021

(65) Prior Publication Data
US 2021/0390180 A1 Dec. 16, 2021

(30) Foreign Application Priority Data
Jun. 10, 2020 (FR) ...................................... 2006059

(51) Int. Cl.
G06F 21/55 (2013.01)
(52) U.S. Cl.
CPC ...... *G06F 21/552* (2013.01); *G06F 2221/034* (2013.01)
(58) Field of Classification Search
CPC .......................... G06F 21/552; G06F 2221/034
See application file for complete search history.

(56) References Cited

U.S. PATENT DOCUMENTS 7,623,378 B1  11/2009 Wahlstrom et al.
8,285,980 B1 * 10/2012 Feng ..................... H04L 9/3247
                                                   713/1
(Continued)

FOREIGN PATENT DOCUMENTS

WO       2016043962 A1    3/2016

OTHER PUBLICATIONS

Martina Arosio • Chiara Boffino • Sergio Morini • Dirk Priefert • Oezguer Albayrak • Viktor Boguszewicz • Andrea Baschirotto; A read/write front-end for an antifuse One-Time-Programmable memory in High Voltage Silicon-On-Insulator technology; 2019 26th IEEE International Conference on Electronics; (Year: 2019).*

(Continued)

*Primary Examiner* — Luu T Pham
*Assistant Examiner* — Chao Wang
(74) *Attorney, Agent, or Firm* — Slater Matsil, LLP

(57) ABSTRACT

A system on a chip comprising a set of one-time programmable memory elements that comprises a first valid configuration; a second valid configuration; and a plurality of invalid configurations. The system on a chip also comprises a programming indicator initially comprising a first value and configured to be permanently set to a second value. The system on a chip further comprises a decoder circuit in communication with the set of one-time programmable memory elements to determine whether the set of one-time programmable memory elements is in the first valid configuration, the second valid configuration, or any one of the plurality of invalid configurations. The decoder circuit generates a threat-detection signal when the set of one-time programmable memory elements is in any of the plurality of invalid configurations when the programming indicator is permanently set to the second value.

29 Claims, 9 Drawing Sheets

(56) References Cited

U.S. PATENT DOCUMENTS

| | | |
|---|---|---|
| 8,918,575 B2 | 12/2014 | Markey et al. |
| 10,476,514 B1* | 11/2019 | Vaz ................... H04L 12/4625 |
| 10,910,079 B2* | 2/2021 | Tuyls ................. H04L 9/0643 |
| 2009/0128189 A1* | 5/2009 | Madurawe ....... H03K 19/17796 326/41 |
| 2012/0206971 A1* | 8/2012 | Chi ....................... G11C 17/08 365/185.18 |
| 2013/0291130 A1* | 10/2013 | Amarilio ................ G06F 21/60 726/30 |
| 2015/0082420 A1 | 3/2015 | Love et al. |
| 2018/0357015 A1* | 12/2018 | Colombo .............. G06F 3/0679 |
| 2019/0107576 A1 | 4/2019 | Sinegre et al. |

OTHER PUBLICATIONS

Hye-Hyun Lee • Kang-Yoon Lee; Design of a Fault Detection Circuit for One-Time Programmable Memories for Reducing Time; 2023 Fourteenth International Conference on Ubiquitous and Future Networks (ICUFN) (2023, pp. 894-897); (Year: 2023).*

W.T. Chan • K.P. Ng • M.C. Lee • K.C. Kwong • L. Li • R.M.Y. Ng • T.Y. Man • M. Chan; CMOS-compatible zero-mask One Time Programmable (OTP) memory design; 2008 9th International Conference on Solid-State and Integrated-Circuit Technology (2008, pp. 861-864); (Year: 2008).*

* cited by examiner

DEVICES AND METHODS TO SECURE A SYSTEM ON A CHIP

TECHNICAL FIELD

The present invention relates generally to systems and methods to secure a system on a chip.

BACKGROUND

The popularity and applications of technologies relating to system on a chip continues to grow. As their use becomes near ubiquitous, concerns about security for systems on a chip also grow. This is of particular concern in areas where the life and safety of end users is at stake like advanced driver assistance systems. In some cases, a system on a chip may employ one-time programmable memory elements to reduce the likelihood of a security breach. For threat detection purposes, it may be helpful to determine whether the one-time programmable memory elements of a system on a chip have previously been programmed.

SUMMARY

In accordance with an embodiment of the present invention a method for operating a system on a chip includes having a set of one-time programmable memory elements, the set including a first valid configuration, a second valid configuration, and a plurality of invalid configurations. In accordance with an embodiment of the present invention the method for operating a system on a chip further includes having a programming indicator that is set to a first value before the set of one-time programmable memory elements is programmed; programming the set of one-time programmable memory elements to the first valid configuration; permanently setting the programming indicator to a second value when the set of one-time programmable memory elements leaves the first valid configuration; and detecting a security threat to the system on a chip when the programming indicator is set to the second value and the set of one-time programmable memory elements is in any one of the invalid configurations of the plurality of invalid configurations.

In accordance with an embodiment of the present invention a system on a chip includes a set of one-time programmable memory elements that comprises: a first valid configuration; a second valid configuration; and a plurality of invalid configurations. The system on a chip further includes a programming indicator initially comprising a first value and configured to be permanently set to a second value. The system on a chip further includes a decoder circuit in communication with the set of one-time programmable memory elements to determine whether the set of one-time programmable memory elements is in the first valid configuration, the second valid configuration, or any one of the plurality of invalid configurations and wherein the decoder circuit generates a threat-detection signal when the set of one-time programmable memory elements is in any of the plurality of invalid configurations when the programming indicator is permanently set to the second value.

In accordance with an embodiment of the present invention a system on a chip includes a set of one-time programmable memory elements that comprises: a first valid configuration; a second valid configuration; a third valid configuration and a plurality of invalid configurations and wherein the set of one-time programmable memory elements is in the first valid configuration when a first location of the set of one-time programmable memory elements is in a first keyed configuration, a second location of the set of one-time programmable memory elements is in any one of a plurality of second invalid-keyed configurations, and a third location of the set of one-time programmable memory elements is in any one of a plurality of third invalid-keyed configurations. The set of one-time programmable memory elements is in the second valid configuration when the first location of the set of one-time programmable memory elements is in any one of a plurality of first invalid-keyed configurations, the second location of the set of one-time programmable memory elements is in a second keyed configuration, and the third location of the set of one-time programmable memory elements is in any one of the plurality of third invalid-keyed configurations. And, the set of one-time programmable memory elements is in the third valid configuration when the first location of the set of one-time programmable memory elements is in any one of the plurality of first invalid-keyed configurations, the second location of the set of one-time programmable memory elements is in the second keyed configuration, and the third location of the set of one-time programmable memory elements is in a third keyed configuration. The system on a chip further includes a programming indicator initially comprising a first value and configured to be permanently set to a second value wherein the programming indicator comprises a one-time programmable memory element, and the system on a chip further includes a decoder circuit comprising a hardware finite state machine in communication with the set of one-time programmable memory elements to determine whether the set of one-time programmable memory elements is in the first valid configuration, the second valid configuration, or any one of the plurality of invalid configurations wherein the decoder circuit generates a threat-detection signal when the of one-time programmable memory elements is in any of the plurality of invalid configurations when the programming indicator is permanently set to the second value.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
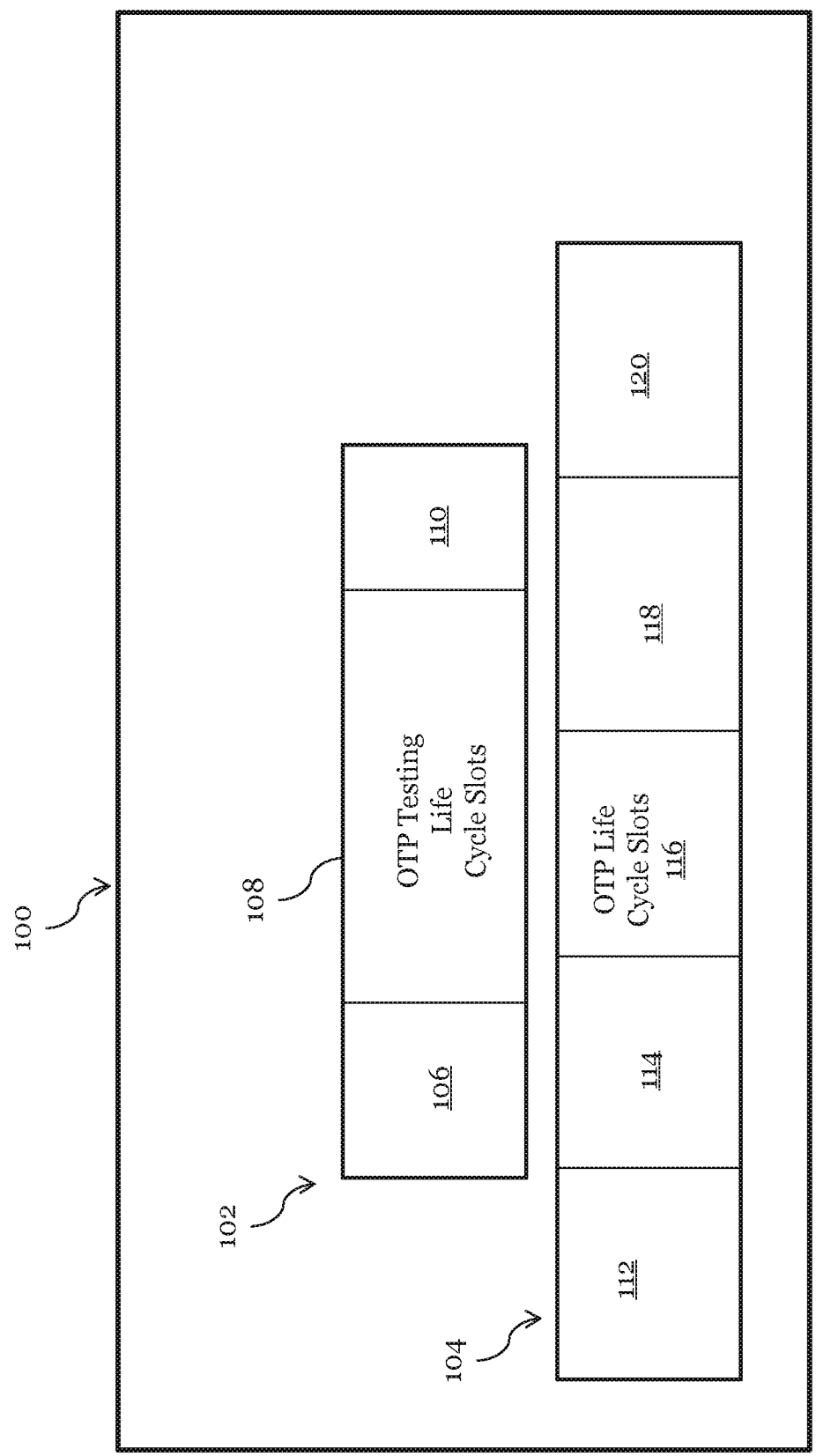
FIG. 1 illustrates an embodiment of a set of one-time programmable memory elements.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Devices utilizing system on a chip ("SoC") technology are becoming pervasive throughout society. Their applications are innumerable and they present opportunities and challenges for designers. Security for a SoC is becoming increasingly important as they are utilized in more and more sensitive applications like automobiles. For example, security is a key requirement for compliance with a variety of standards like the EVITA project and the SHE Specification. EVITA standards relate to security for on-board automotive systems. And, the SHE Specification relates to guidelines for a secure zone within an automobile.

Designers have implemented a variety of measures to combat security threats to SoCs. However, as the measures may restrict potential hacking attempts, they may also restrict the ability of designers and manufacturers to test their products before they are shipped to consumers including, but not limited to original equipment manufacturers ("OEMs").

Some SoCs may have more than one security setting that corresponds to different lifecycle stages of the device. As the device progresses through various stages of its lifecycle, different security measures may be enabled to allow manufacturers and designers to test or modify their product. For example, a lower security setting may be desirable while the product is still in a product-manufacturing lifecycle at the manufacturer's facility to allow for aforementioned testing.

Once, the product is released to an OEM, or other customer, the product may be considered to be in an in-field lifecycle. The product may not require the same level of testing when in the in-field lifecycle so a heightened security setting may be desirable. A failure analysis lifecycle may correspond to a third security setting when the product has been returned to the product manufacturer for failure analysis. Additional lifecycles and security settings may be needed for different products.

The lifecycle of a SoC may be identified by using one-time programmable memory XXXXs. As will be appreciated by one of ordinary skill in the art, a one-time programmable ("OTP") memory element may be permanently and irreversibly programmed to hold a value. Thus, a one-time programmable memory element may only be programmed a single time. A variety of types of OTP memory elements exist including, but not limited to, laser-fuse, electric-fuse, and anti-fuse.

The life cycle of a SoC may be decoded by reading the one time programmable memory elements. A given configuration of the OTP elements may correspond to a lifecycle and an associated security level may be set accordingly. However, as explained in more detail, below issues can arise distinguishing invalid configurations of a set of OTP memory elements from a yet-to-be programmed set of OTP memory elements.

It may be desirable for the SoC to be in a low security setting immediately after manufacturing before any programming of the SoC elements has taken place. A first valid configuration corresponding to a product-manufacturing lifecycle may be programmed into a set of OTP memory elements while testing is performed and a corresponding low-level security setting may be maintained.

Once the product exits the product-manufacturing stage, the set of OTP memory elements may be programmed into a second valid configuration that corresponds to the in-field lifecycle. A heightened security level may be enabled. If the product enters a failure analysis lifecycle, the set of OTP memory elements may be programmed into a third valid configuration that enables a third security setting. The third security setting may provide more or less security depending on the embodiment. In different embodiments, a SoC may comprise more or less valid configurations and security settings.

A hacking attack during the in-field lifecycle or the failure-analysis lifecycle may change the configuration of the set of OTP elements by programing previously unprogrammed OTP elements. This will take the set of OTP elements out of a valid configuration and place it in an invalid configuration. This can cause the security setting to revert to the low-level security setting that corresponds to the product-manufacturing lifecycle if there is no means for the SoC to distinguish an invalid-programmed configuration from an invalid un-programmed configuration. This will be further described below.

FIG. 1 illustrates an embodiment of a set of OTP memory elements 100. In some embodiments, the set of OTP memory elements 100 comprises a first subset of OTP memory elements 102 and a second subset of OTP memory elements 104. The first subset of OTP memory elements 102 may be divided into locations. The locations of the first subset of OTP memory elements 102 may, or may not, be adjacent in various embodiments.

In embodiments, the first subset of OTP memory elements 102 may be divided into a first location 106, a second location 108, and a third location no. Any or all of the first location 106, the second location 108, or the third location no may comprise a plurality of OTP memory elements. In some embodiments, each OTP memory element may comprise a bit. This may be true of any OTP memory element of this disclosure. In various embodiments, some or all of the first location 106, the second location 108, and the third location no may be physically adjacent to each other. In various embodiments, some or all of the first location 106, the second location 108, and the third location no may not be physically adjacent to each other. In various embodiments, the OTP memory elements of one, all, or some of the locations may or may not be adjacent to each other.

In embodiments, the second subset of OTP memory elements 104 may be divided into a fourth location 112, a fifth location 114, a sixth location 116, a seventh location 118, and an eighth location 120. Any or all of fourth location 112, fifth location 114, sixth location 116, seventh location 118, or eighth location 120 may comprise a plurality of OTP memory elements. The second subset of OTP memory elements 104 may be associated with OEM lifecycles. In various embodiments, some or all of the fourth location 112, the fifth location 114, the sixth location 116, the seventh location 118, and the eighth location 120 may be physically adjacent to each other. In various embodiments, some or all of the fourth location 112, the fifth location 114, the sixth location 116, the seventh location 118, and the eighth location 120 may not be physically adjacent to each other. In various embodiments, the OTP memory elements of one, all, or some of the locations may or may not be adjacent to each other.

In some embodiments, the first subset of OTP memory elements 102 may be associated with locations that correspond to testing lifecycles of a system on a chip. Keys for the corresponding lifecycle may be stored on the OTP memory elements of a location. The first location 106 may correspond to a product-manufacturing lifecycle. The second location 108 may correspond to an in-field lifecycle. The third location no may correspond to a failure analysis lifecycle.

In embodiments, the first location 106 may comprise a first keyed configuration of OTP memory elements and a plurality of invalid-keyed configurations. The second location 108 may comprise a keyed configuration of OTP memory elements, and a plurality of invalid-keyed configurations. In embodiments, the third location no may comprise a first keyed configuration of OTP memory elements and a plurality of invalid-keyed configurations. Different patterns of the configuration of the first location 106, the second location 108, and the third location no may correspond to the product-manufacturing lifecycle, the in-field lifecycle or the failure analysis lifecycle. Table 1 below demonstrates a way that the patterns of the configuration of the first location 106, the second location 108, and the third location no may correspond to the product-manufacturing lifecycle, the in-field lifecycle or the failure analysis lifecycle.

TABLE 1

| First Location | Second Location | Third Location | Testing Lifecycle (Decoding Result) |
|---|---|---|---|
| valid key | anything but valid key | anything but valid key | Product Manufacturing |
| anything but valid key | valid key | anything but valid key | In-Field |
| anything but valid key | valid key | valid key | FA |
| | anything else | | Product Manufacturing |

The first row of Table 1 demonstrates a pattern of the first location 106, the second location 108 and the third location 110 that may reflect a first valid configuration of the set of OTP memory elements 100. This may be decoded as a product-manufacturing lifecycle. In this configuration, the first location 106 is in the valid keyed configuration, the second location 108 is an invalid-keyed configuration, and the third location 110 is an invalid-keyed configuration.

The second row of Table 1 demonstrates a pattern of the first location 106, the second location 108 and the third location 110 that may reflect a second valid configuration of the set of OTP memory elements 100. This may be decoded as an in-field lifecycle. In this configuration, the first location 106 is in an invalid-keyed configuration, the second location 108 is a valid-keyed configuration, and the third location 110 is an invalid-keyed configuration.

The third row of Table 1 demonstrates a pattern of the first location 106, the second location 108 and the third location 110 that may reflect a third valid configuration of the set of OTP memory elements 100. This may be decoded as a failure analysis lifecycle. In this configuration, the first location 106 is in an invalid-keyed configuration, the second location 108 is a valid-keyed configuration, and the third location no is a valid-keyed configuration.

As seen in Table 1, any other combination of configurations of the first location 106, the second location 108, and the third location no may also be corresponded to the product manufacture life cycle. This allows the SoC to be set to a low security setting before the set of OTP memory elements has been programmed no matter the configuration of the un-programmed set of OTP memory elements. However, a hacking attack may also change the security level to the low level intended for the product-manufacturing lifecycle by programming the set of OTP memory elements 100 from a valid configuration into an invalid configuration.

Figure 2:
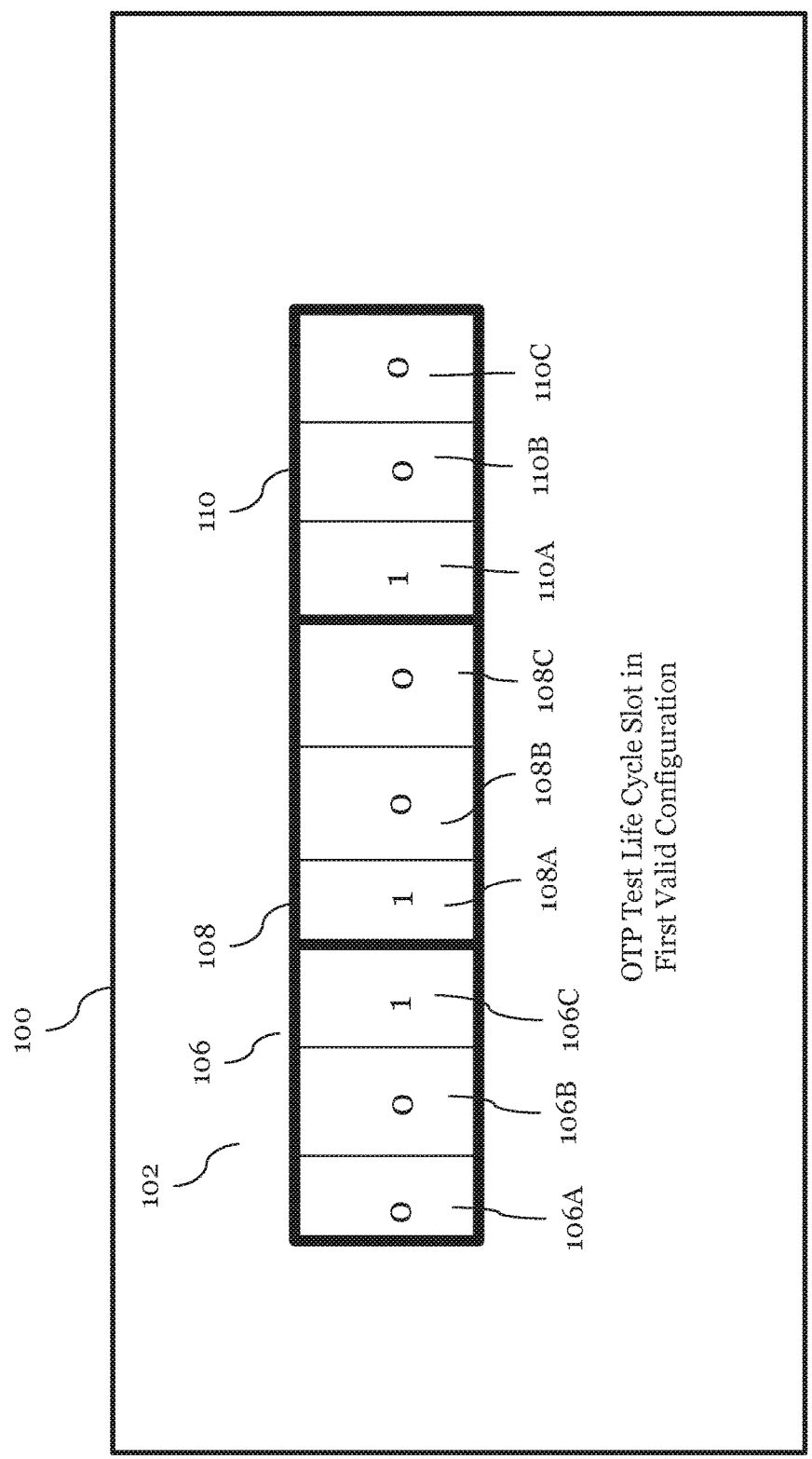
FIG. 2 illustrates an embodiment of a set of one-time programmable memory elements is a first valid configuration.

FIG. 2 illustrates an embodiment of the first subset of OTP memory elements 102 in a set of one-time programmable memory elements in a first valid configuration. The first location 106 may comprise a first bit of the first location 106A, a second bit of the first location 106B, and a third bit of the first location 106C. Similarly, the second location 108 may comprise a first bit of the second location 108A, a second bit of the second location 108B, and a third bit of the second location 108C. The third location 1110 may comprise a first bit of the third location 110A, a second bit of the third location 110B, and a third bit of the third location 110C. In different embodiments, the first location 106, the second location 108, and the third location 110 may each comprise any number of OTP memory elements.

In an embodiment wherein the first location 106 comprises three bits, the first keyed configuration may comprise any desired three-bit sequence. This is also true for the second location 108 and the third location no. Obviously, in embodiments where the first location 106, the second location 108, or the third location no comprises more bits, the number of potential configurations increases.

In an example, the first keyed configuration may comprise the bit sequence "001," the second keyed configuration may be the bit sequence "110", and the third keyed configuration may also be the bit sequence "110." As can be seen in FIG. 2, the first location 106 is programmed with the bit sequence "001," the first keyed configuration. The second location 108 is programmed with bit sequence "100", which does not correspond to the second keyed configuration so it is in one of the second invalid-keyed configurations. Likewise, the third location no is programmed with bit sequence "100", which does not correspond to the third keyed configuration so it is in one of the third invalid-keyed configurations. This pattern corresponds to a first valid configuration of the set of OTP memory elements 100.

Figure 3:
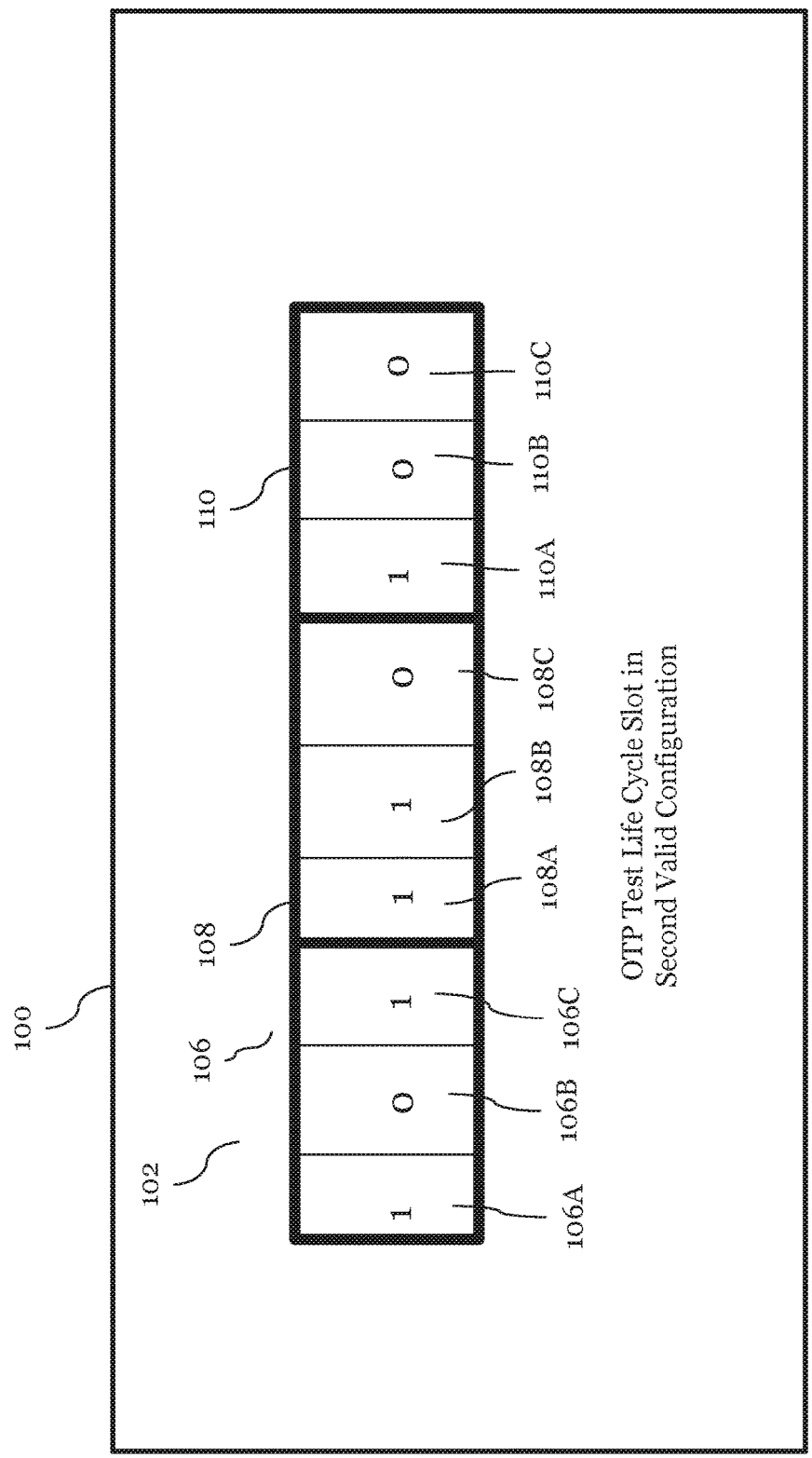
FIG. 3 illustrates an embodiment of a set of one-time programmable memory elements is a second valid configuration.

In embodiments, the first keyed configuration may have been programmed into the set of OTP memory elements 100 and maintained during the product-manufacturing lifecycle. In some embodiments, when progressing to the in-field life cycle, the first location 106 may be taken out of the first keyed configuration, or invalidated, by programming a previously un-programmed OTP element of the first location 106. As seen in FIG. 3, the first bit of the first location has been programmed from a "o" to a "1" thereby transitioning the first location 6 to one of the plurality of first invalid-keyed configurations. It should be appreciated that this may not be necessary in all embodiments.

FIG. 3 illustrates an embodiment of a set of OTP memory elements 100 is a second valid configuration. The first location 106 is now programmed with the bit sequence "101," a first un-keyed configuration. The second location 108 is programmed with bit sequence "101," the second keyed configuration. The third location no is programmed with bit sequence "100," which does not correspond to the third keyed configuration so it is in one of the third invalid-keyed configurations. This pattern corresponds to a second valid configuration of the set of OTP memory elements 100. In some embodiments, this may be decoded as the in-field testing lifecycle and enable a high security setting.

Figure 4:
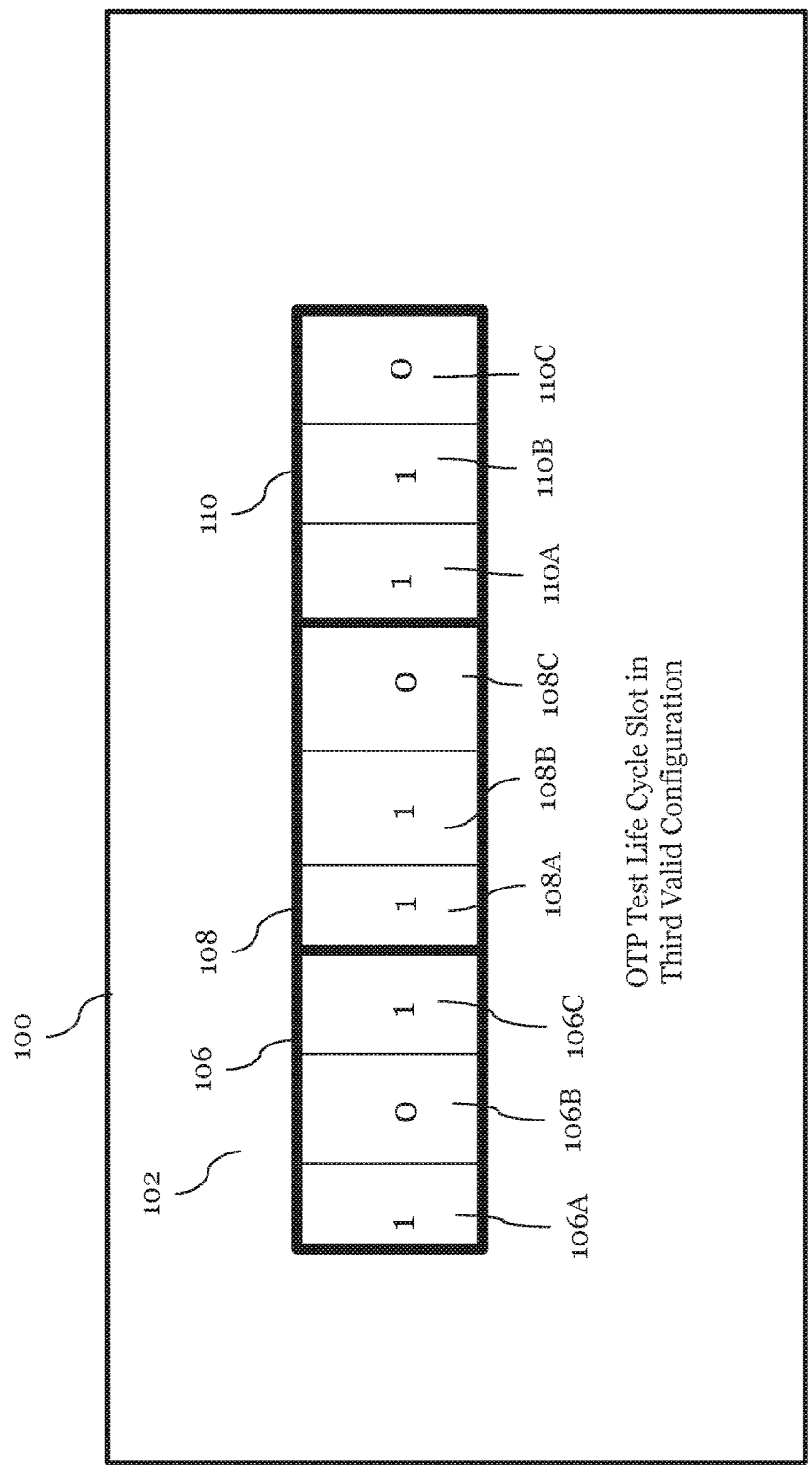
FIG. 4 illustrates an embodiment of a set of one-time programmable memory elements is a third valid configuration.

FIG. 4 illustrates an embodiment of a set of OTP memory elements 100 in a third valid configuration. The first location 106 remains programmed with the bit sequence "101," a first un-keyed configuration. The second location 108 is still programmed with bit sequence "110," the second keyed configuration. And, the third location no is programmed with bit sequence "110," the third keyed configuration. In this example, as demonstrated in Table 1, this pattern corresponds to a third valid configuration of the set of OTP memory elements "100." In some embodiments, this may be decoded as the failure-analysis lifecycle and enable a corresponding life cycle.

If a hacking attack were to change any of the un-programmed bits, it would put the set of OTP memory elements into an invalid configuration and may enable the low security setting giving providing undesirable access to the SoC.

As mentioned earlier the second subset of OTP memory elements 104 may be associated with OEM lifecycles. In some embodiments, the second subset of OTP memory elements 104 may be associated with locations that correspond to OEM lifecycles of a system on a chip. Keys for the corresponding lifecycle may be stored on the OTP memory elements of a location. Patterns of configurations of these elements may be decoded to determine an OEM lifecycle of the product. In embodiments, the results decoded from these locations may be related to results decoded from the testing lifecycles associated with the first subset of OTP memory elements 102, as will be discussed.

In different embodiments, the different locations may be corresponded to different categories. In some embodiments the second subset of OTP memory elements 104 may comprise more or less locations. By way of example in some embodiments, the fourth location 112 may be corresponded to the product-manufacturing lifecycle. In embodiments, this may be programmed separately from any other location associated with a product-manufacturing lifecycle, for example the product-manufacturing lifecycle discussed with reference to the first subset of OTP memory elements 102. In some embodiments a fifth location 114 may correspond to a customer delivery lifecycle. In some embodiments, a sixth location 116 may correspond to an OEM production lifecycle. In some embodiments, a seventh location 118 may correspond to an in-field lifecycle. In embodiments, this may be programmed separately from any other location associated with an in-field lifecycle, for example the in-field lifecycle discussed with reference to the first subset of OTP memory elements 102. In some embodiments the eighth location 120 may correspond to a failure-analysis lifecycle. In embodiments, this may be programmed separately from any other location associated with a failure analysis life cycle, for example the failure analysis lifecycle discussed with reference to the first subset of OTP memory elements 102.

In various embodiments, the fourth location 112, the fifth location 114, the sixth location 116, the seventh location 118, and the eighth location 120 may be programmed in any manner described in relation to the first location 106, the second location 108, or the third location 110.

Continuing on the example above, Table 2 demonstrates one way that patterns of configurations of the fourth location 112, the fifth location 114, the sixth location 116, the seventh location 118, and the eighth location 120 may be decoded.

TABLE 2

| OEM Life Cycle Slots | | | | | OEM |
|---|---|---|---|---|---|
| Product Manu-facturing | Customer Delivery | OEM Production | In Field | Failure Analysis | Lifecycle (Decoding Result) |
| valid key | un-programmed | un-programmed | un-programmed | un-programmed | Product Manu-facturing |
| invalid key | valid key | un-programmed | un-programmed | un-programmed | Customer Delivery |
| invalid key | invalid key | valid key | un-programmed | un-programmed | OEM Prod |
| invalid key | invalid key | invalid key | valid key | un-programmed | In Field |
| invalid key | invalid key | invalid key | invalid key | valid key | Failure Anaylsis |

In various embodiments, the results decoded the fourth location 112, the fifth location 114, the sixth location 116, the seventh location 118, and the eighth location 120 may also be determined by the testing lifecycle of the product, for example, as is demonstrated by Table 3 in the continuing example.

TABLE 3

| OEM Life Cycle Slots | | | | | | |
|---|---|---|---|---|---|---|
| Product Manufacturing | Customer Delivery | OEM Production | In Field | Failure Analysis | Test Life Cycle | OEM Life Cycle |
| any combination of values except the ones shown | | | | | Production Manufacturing | Production Manufacturing |
| any combination of values except the ones shown | | | | un-programmed | In Field or Failure Analysis | In Field |
| any combination of values except the ones shown | | | | un-programmed | In Field or FA | System Reset |
| un-programmed | | | | | In Field | System Reset |

As demonstrated in the fourth row, if the locations corresponding to the Product Manufacturing, Customer Delivery, OEM Production, In Field, and Failure Analysis OEM lifecycles are all un-programmed and the testing lifecycle is decoded as being In-Field, the SoC may enable a System Reset.

As demonstrated in the third row, if the locations corresponding to the Product Manufacturing, Customer Delivery, OEM production, In-Field, and Failure Analysis lifecycles are in any pattern of configurations not shown in Table 2 and the testing lifecycle is decoded as being Failure Analysis or In-Field, the SoC may enable a System Reset.

As demonstrated in the second row, if the locations corresponding to the Product Manufacturing, Customer Delivery, OEM production, and In-Field, are in any pattern of configurations not shown, and the location corresponding to Failure Analysis is un-programmed, and the testing lifecycle is decoded as being Failure Analysis or In-Field, the OEM Life Cycle will be decoded as In Field.

As demonstrated in the first row, if the locations corresponding to the Product Manufacturing, Customer Delivery, OEM production, and In-Field, and Failure Analysis are in any pattern of configurations not shown, and the testing lifecycle is decoded as Product Manufacturing, the OEM Life Cycle will be decoded as Product Manufacturing.

Figure 5:
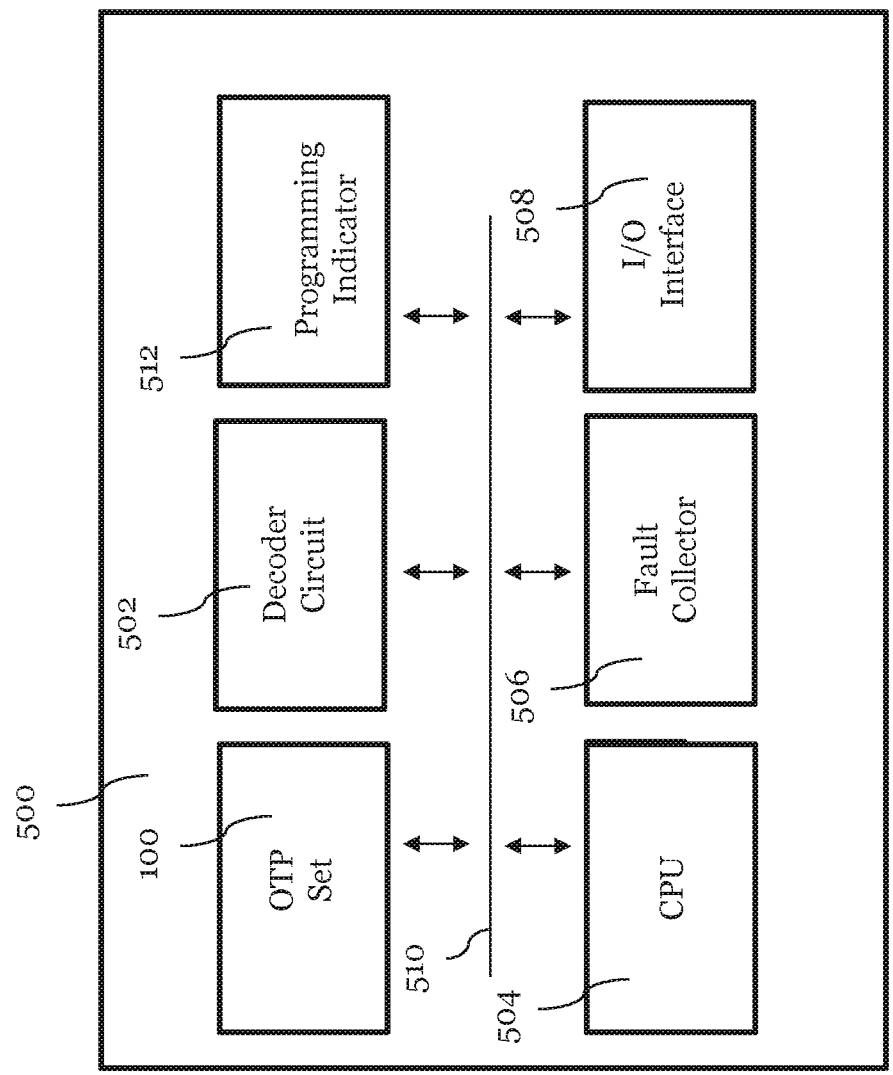
FIG. 5 illustrates an embodiment of a system on a chip with an OTP programming indicator.

FIG. 5 illustrates an embodiment of a system on a chip ("SoC") 500 with a programming indicator 512. In various embodiments, the programming indicator 512 may allow security threats to be detected and breaches blocked.

In some embodiments, the SoC 500 may comprise a set of OTP memory elements 100. In some embodiments, the SoC 500 may also comprise a decoder circuit 502. The decoder circuit 502 may comprise a hardware finite state machine. In some embodiments, the SoC 500 may also comprise a Central Processing Unit ("CPU") 504. In some embodiments, the SoC 500 may also comprise a fault collector circuit 506. And, in some embodiments, the SoC 500 may also comprise an input/output interface 508 for the SoC 500.

The SoC 500 may also comprise a bus network 510 that is in communication with other components of the SoC 500, potentially including, but not limited the set of OTP memory elements 100, decoder circuit 502, CPU 504, Fault Collector Circuit, and input/output interface 508. The bus network may comprise all necessary logic and circuitry to allow communication between the components of the SoC 500.

As discussed above, SoC 500 may also comprise a programming indicator 512. The programming indicator may allow the SoC to detect when the set of OTP memory elements 100 has been programmed. In various embodiments, programming indicator 512 may comprise a first value when the set of OTP memory elements 100 is in an initial, un-programmed state. When the set of OTP memory elements 100 has been programmed, the programming indicator 512 may be set to second value. In various embodiments, the programming indicator 512 may be set to the second value as soon as the set of OTP memory elements 100 is programmed in any way. In various embodiments, the programming indicator 512 may be set to second value as soon as the SoC leaves a Product Manufacturing testing lifecycle or as soon as it enters an in-field testing lifecycle. In various embodiments, the programming indicator 512 may be manually set. In various embodiments, the programming indicator may be triggered to the second value when the set of OTP memory elements 100 is programmed. In various embodiments, the programming indicator 512 may be permanently set to the second value.

Once the programming indicator 512 has been set to the second value, the SoC may distinguish an invalid un-programmed value—when it may be desirable to have a low level security setting immediately after manufacture—from an invalid value after programming.

Table 4 below demonstrates an example of how this may be accomplished in various embodiments.

TABLE 4

| Testing Lifecycle | OEM Lifecycle | Programming Indicator | Result |
| --- | --- | --- | --- |
| Product Manufacturing | Product Manufacturing | 0 | OK |
| Product Manufacturing | Don't care | 1 | NOK |
| In Field | Don't care | 0 | NOK |
| In Field | Don't care | 1 | OK |
| FA | Don't care | 0 | NOK |
| FA | Don't care | 1 | OK |

In the example shown in Table 4 "0" corresponds to the first value and "1" corresponds to the second value. However, various embodiments may comprise other values for the first value and the second value. In the first row of Table 4, the testing lifecycle and the OEM are both in Product-manufacturing lifecycles. This covers the initial setting of the set of OTP memory elements wo and the first valid configuration.

In this example, if the programming indicator 512 is set to 1 and the testing lifecycle is decoded as product manufacturing, then a hacking attack may have occurred. This case corresponds to a scenario when a hacking attack has taken the set of OTP memory elements 100 out of a valid configuration and into and invalid configuration. But, because the programming indicator is set to 1, the SoC may distinguish the un-programmed invalid configuration from the hacking attack that puts the set of OTP memory elements 100 into an invalid configuration after it has been programmed.

In various embodiments, when the decoder circuit 502 detects when this occurs it may generate a threat-detection signal. In various embodiments, the decoder circuit 502 may generate signals that enable different security levels depending on the testing life cycle. In various embodiments, when the decoder circuit 502 generates a threat-detection signal, it may trigger a System Reset. In this way, the security threat may be detected and prevent the security setting from reverting to a low level.

In the third row, the programming indicator 512 may incorrectly be set to 0 because the programming indicator 512 may need to be set to 1 before entering, or upon entering, the In-Field testing lifecycle. In such cases, the decoder circuit 502 may generate an interrupt signal that is delivered to the CPU 504. In some embodiments, the information may also be sent to a Fault Collector for later analysis. In various embodiments, the programming indicator 512 may need to be correctly set before operations of the SoC resume.

The fifth row also illustrates another example where the programming indicator 512 may be incorrectly set. In this case, the programming indicator 512 may need to have been set earlier. In such cases, the decoder circuit 502 may generate an interrupt signal that is delivered to the CPU 504. In some embodiments, the information may also be sent to a fault collector circuit 506 for later analysis.

Utilizing a programming indicator 512 for threat detection is also advantageous because, in various embodiments, it may be flexible without a dependency on technology. In various embodiments, it may not require application-specific circuitry. In various embodiments, it may be applied to any kind of memory including, but not limited to, embedded flash, OTP memory, multi-time programmable memory and non-volatile flash. For example, the programming indicator 512 could be utilized in a SoC wherein the set of OTP memory elements 100 is replaced in whole or in part with flash memory, multi-time programmable memory, non-volatile flash memory, or other type of memory.

Furthermore, the un-programmed state of the set of OTP memory elements 100 may be any value as the setting of the programming indicator 512 is independent of the initial configuration of the set of the memory.

In various embodiments, the programming indicator 512 may comprise a bit of one-time programmable memory. In various embodiments the bit may be triple voted. In various embodiments the programming indicator 512 may be 32 bit pattern. As can be appreciated, the programming indicator 512 may comprise different forms of memory or a different number of bits. In some embodiments, the programming indicator 512 may be disposed with or in the set of OTP memory elements 100.

Figure 6:
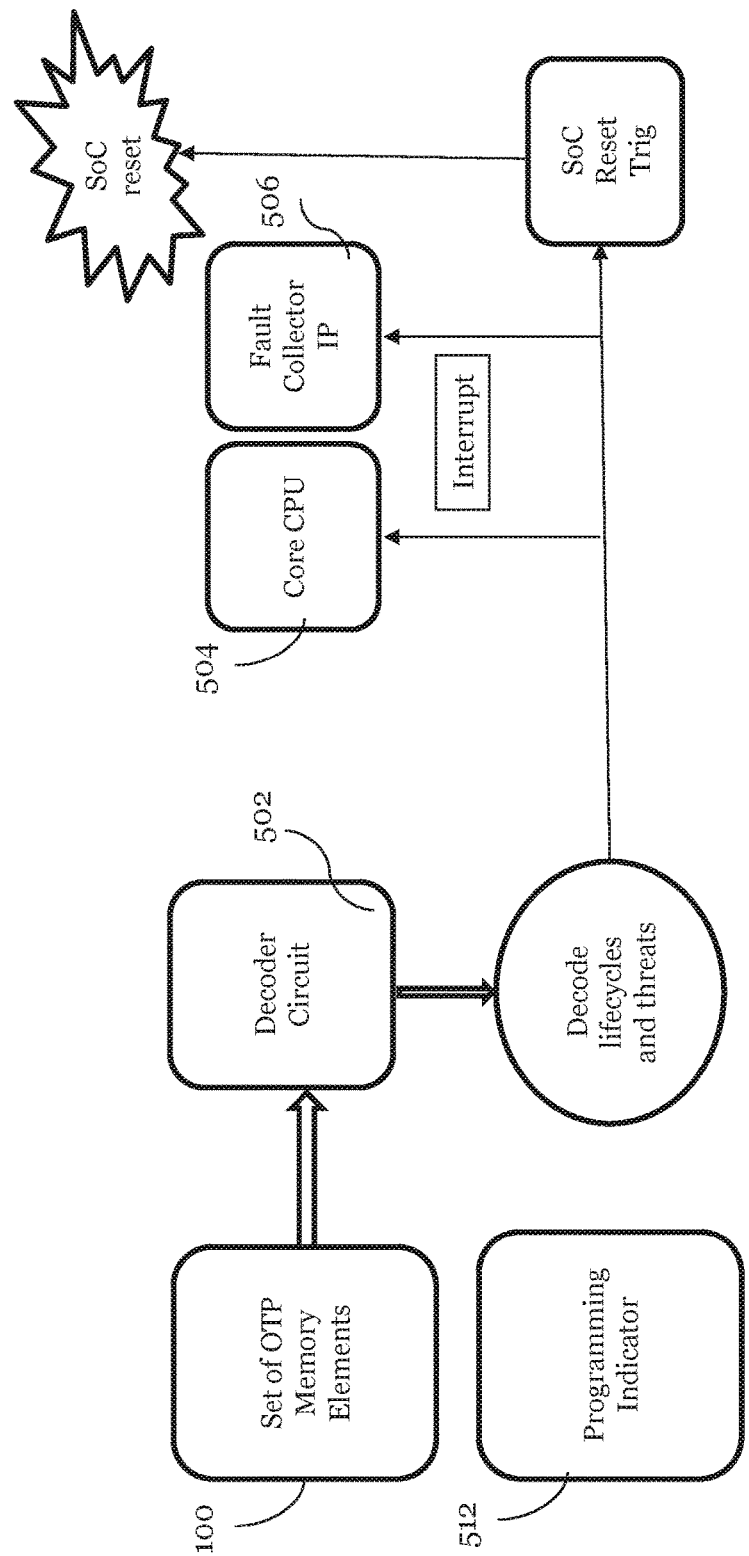
FIG. 6 is flow chart for detecting a threat to a system on a chip.

FIG. 6 is flow chart for detecting a threat to a SoC. The set of OTP memory elements 100 and programming indicator is read by the decoder circuit 502. Depending on the result the decoder circuit 502 may generate an interrupt signal, as described above, that is delivered to the CPU 504, the fault collector circuit 506, or both. In various embodiments, depending on the results, the decoder circuit 502 may generate a threat-detection signal. In various embodiments, this may trigger a SoC reset.

Figure 7:
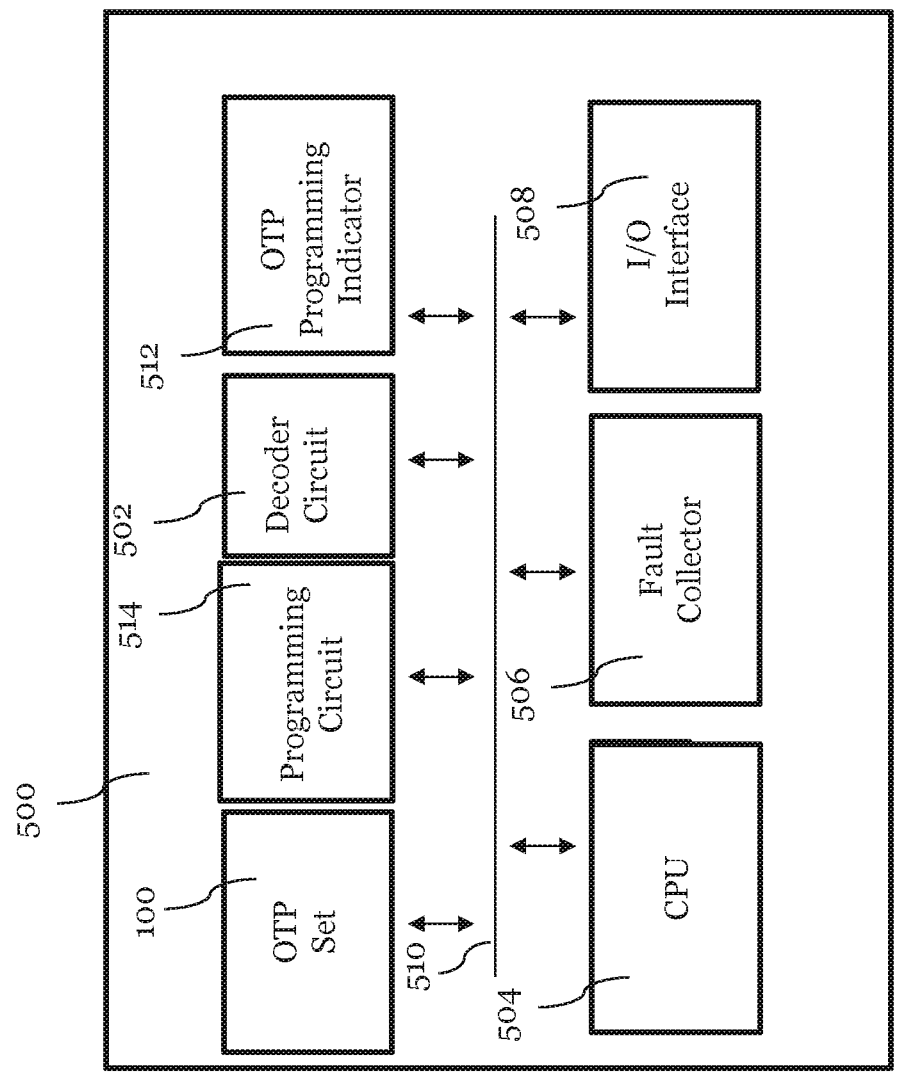
FIG. 7 illustrates an embodiment of a system on a chip with an OTP programming indicator.

FIG. 7 illustrates an embodiment of a SoC 500 with an OTP programming indicator. In various embodiments, the SoC 500 may also comprise a programming circuit 514. The programming circuit 514 may be in communication with bus network 510. The programming circuit 514 may be in direct or indirect communication with the set of OTP memory elements 100 and program the set of OTP memory elements 100. In various embodiments the set of OTP memory elements 100 may be programmed at the engineering level. In various embodiments, the set of OTP memory elements 100 may be programmed at software application level.

Figure 8:
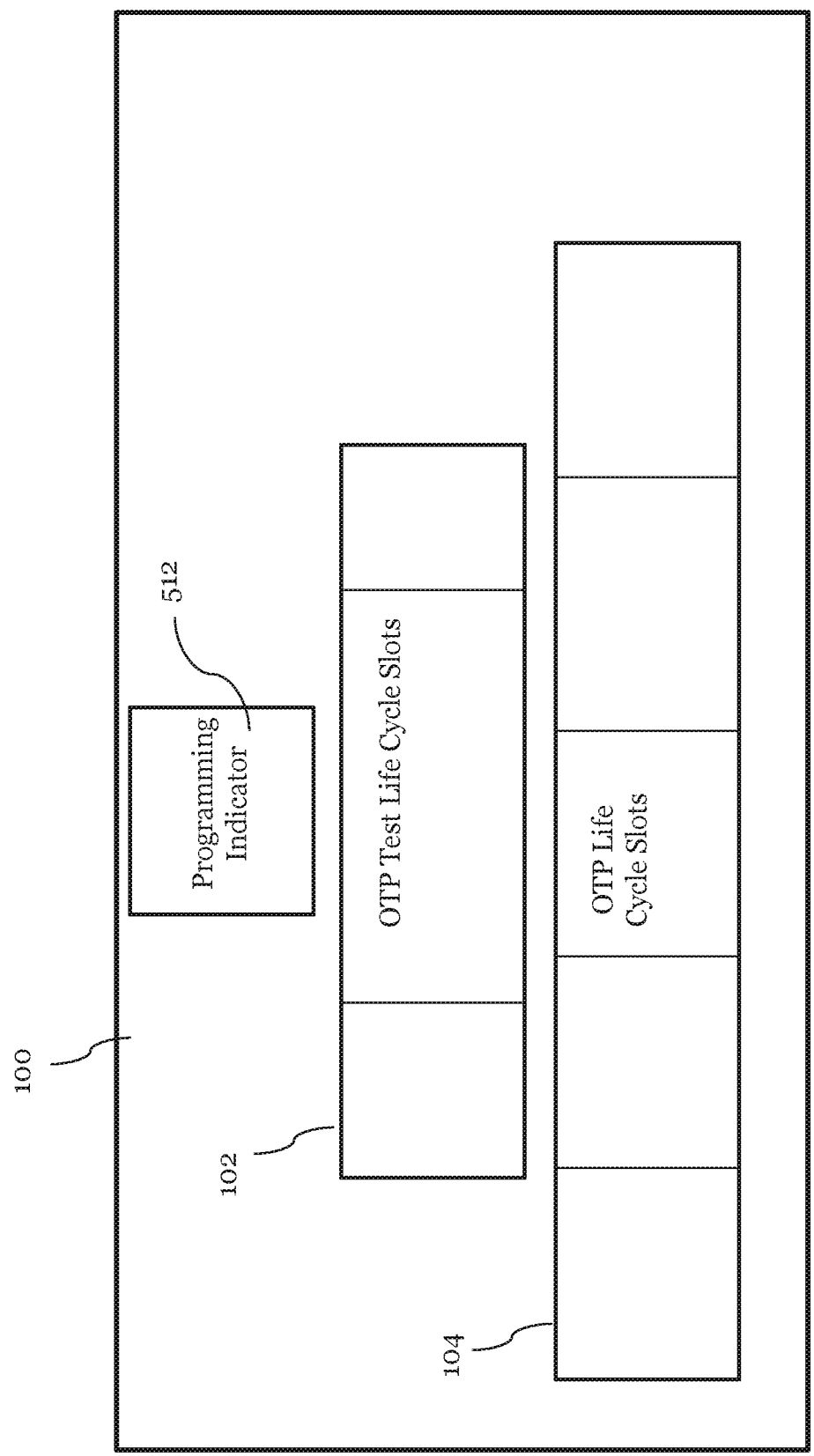
FIG. 8 illustrates an embodiment of a set of OTP memory elements.

FIG. 8 illustrates an embodiment of the set of OTP memory elements wo wherein the programming indicator 512 is disposed in the set of OTP memory elements 100.

Figure 9:
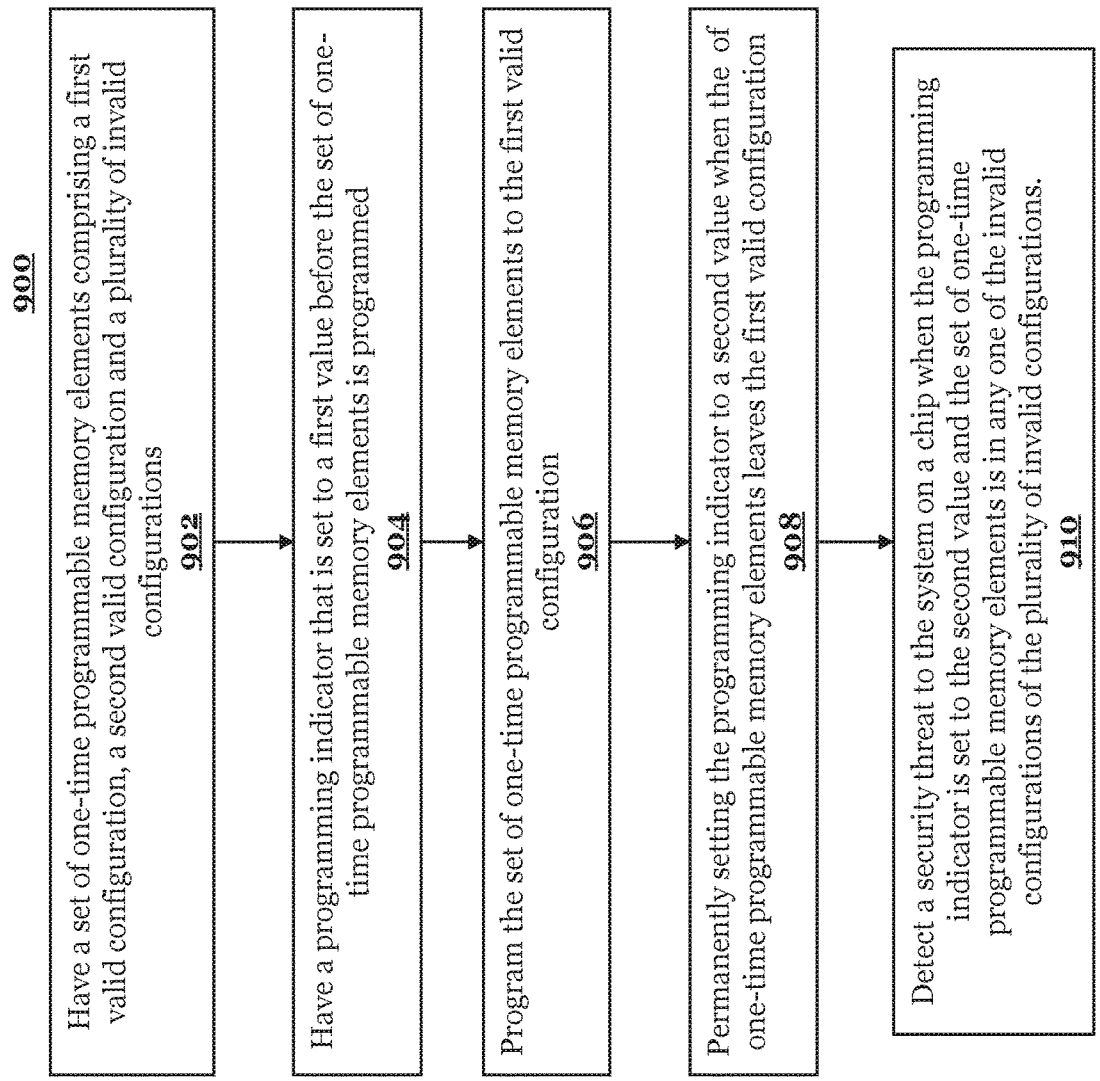
FIG. 9 illustrates a method for providing security to a system on a chip.

FIG. 9 illustrates a block diagram of a method 900 for providing security to a system on a chip comprising, in various embodiments, at a first step 902 having a set of one-time programmable memory elements comprising a first valid configuration, a second valid configuration and a plurality of invalid configurations.

In some embodiments, at a second step 904 the method 90o comprises having a programming indicator that is set to a first value before the set of one-time programmable memory elements is programmed.

In some embodiments at a third step 906, the method 900 may comprise programming the set of one-time programmable memory elements to the first valid configuration. In some embodiments a fourth step 908 may comprise permanently setting the programming indicator to a second value when the set of one-time programmable memory elements is programmed out of the first valid configuration.

In some embodiments at a fifth step 910, the method 900 may comprise detecting a security threat to the system on a chip when the programming indicator is set to the second value and the set of one-time programmable memory elements is in any one of the invalid configurations of the plurality of invalid configurations.

In some embodiments, the method 900 further comprises resetting the system on a chip when the programming indicator is set to the second value and the set of one-time programmable memory elements is in any one of the invalid configurations of the plurality of invalid configurations.

In some embodiments, the method 900 further comprises having the programming indicator comprise a bit of one-time programmable memory.

In some embodiments, the method 900 further comprises permanently setting the programming indicator to a second value comprises programming the bit of one-time programmable memory.

In some embodiments, the method 900 further comprises: setting a security level of the system on a chip to a first security level when the programming indicator is in the first value; and setting the security level of the system on a chip to a second security level when the set of one-time programmable memory elements is in the second valid configuration.

In some embodiments of the method 900 the second security level comprises a heightened security level.

In some embodiments the method 900 further comprises generating an interrupt signal when the programming indicator is set to the first value and the set of one-time programmable memory elements is in the second valid configuration.

In some embodiments of the method 900 the set of one-time programmable memory elements is programmable into a third valid configuration and the method 900 further comprises setting the security level of the system on a chip to a third security level when the set of one-time programmable memory elements is in the third valid configuration.

In some embodiments of the method 900 the third security level comprises a heightened security level.

In some embodiments of the method 900, the set of one-time programmable memory elements comprises: a first location of one-time programmable memory elements that comprises a first keyed configuration and a plurality of first invalid-keyed configurations; a second location of one-time programmable memory elements that comprises a second keyed configuration and a plurality of second invalid-keyed configurations; and a third location of one-time programmable memory elements that comprises a third keyed configuration and a plurality of third invalid-keyed configurations.

In some embodiments of the method 900, the set of one-time programmable memory elements is in the first valid configuration when the first location of one-time programmable memory elements is in the first keyed configuration, the second location of one-time programmable memory elements is in any one of the plurality of second invalid-keyed configurations, and the third location of one-time programmable memory elements is in any one of the plurality of third invalid-keyed configurations.

In some embodiments of the method 900, the set of one-time programmable memory elements is in the second valid configuration when the first location of one-time programmable memory elements is in any one of the plurality of first invalid-keyed configurations, the second location of one-time programmable memory elements is in the second keyed configuration, and the third location of one-time programmable memory elements is in any one of the plurality of third invalid-keyed configurations.

In some embodiments of the method 900, the set of one-time programmable memory elements is in the third valid configuration when the first location of one-time programmable memory elements is in any one of the plurality of first invalid-keyed configurations, the second location of one-time programmable memory elements is in the second keyed configuration, and the third location of one-time programmable memory elements is in the third keyed configuration.

In some embodiments of the method 900, the first valid configuration corresponds to a first product lifecycle of the system on a chip, the second valid configuration corresponds to a second product lifecycle of the system on a chip, and the third valid configuration corresponds to a third product lifecycle of the system on a chip.

Example embodiments of the invention are summarized here. Other embodiments can also be understood from the entirety of the specification as well as the claims filed herein.

Example 1. A method for operating a system on a chip may include: having a set of one-time programmable memory elements, the set including a first valid configuration, a second valid configuration, and a plurality of invalid configurations; having a programming indicator that is set to a first value before the set of one-time programmable memory elements is programmed; programming the set of one-time programmable memory elements to the first valid configuration; permanently setting the programming indicator to a second value when the set of one-time programmable memory elements leaves the first valid configuration; and detecting a security threat to the system on a chip when the programming indicator is set to the second value and the set of one-time programmable memory elements is in any one of the invalid configurations of the plurality of invalid configurations.

Example 2. The method of example 1, further including resetting the system on a chip when the programming indicator is set to the second value and the set of one-time programmable memory elements is in any one of the invalid configurations of the plurality of invalid configurations.

Example 3. The method of examples 1 or 2 further including having the programming indicator include a bit of one-time programmable memory; and wherein permanently setting the programming indicator to a second value includes programming the bit of one-time programmable memory.

Example 4. The method examples 1 to 3, further including: setting a security level of the system on a chip to a first security level when the programming indicator is in the first value; and setting the security level of the system on a chip to a second security level when the set of one-time programmable memory elements is in the second valid configuration.

Example 5. The method of examples 1 to 4 wherein the second security level is a heightened security level.

Example 6. The method of examples 1 to 5 further including generating an interrupt signal when the programming indicator is set to the first value and the set of one-time programmable memory elements is in the second valid configuration.

Example 7. The method of examples 1 to 6 wherein the set of one-time programmable memory elements is programmable into a third valid configuration and further including: setting the security level of the system on a chip to a third security level when the set of one-time programmable memory elements is in the third valid configuration.

Example 8. The method of examples 1 to 7 wherein the third security level is a heightened security level.

Example 9. The method of examples 1 to 8, wherein the set of one-time programmable memory elements includes: a first location of one-time programmable memory elements that includes a first keyed configuration and a plurality of first invalid-keyed configurations; a second location of one-time programmable memory elements that includes a second keyed configuration and a plurality of second invalid-keyed configurations; and a third location of one-time programmable memory elements that includes a third keyed configuration and a plurality of third invalid-keyed configurations.

Example 10. The method of examples 1 to 9, wherein the set of one-time programmable memory elements is in the first valid configuration when the first location of one-time programmable memory elements is in the first keyed configuration, the second location of one-time programmable memory elements is in any one of the plurality of second invalid-keyed configurations, and the third location of one-time programmable memory elements is in any one of the plurality of third invalid-keyed configurations; the set of one-time programmable memory elements is in the second valid configuration when the first location of one-time programmable memory elements is in any one of the plurality of first invalid-keyed configurations, the second location of one-time programmable memory elements is in the second keyed configuration, and the third location of one-time programmable memory elements is in any one of the plurality of third invalid-keyed configurations; and the set of one-time programmable memory elements is in the third valid configuration when the first location of one-time programmable memory elements is in any one of the plurality of first invalid-keyed configurations, the second location of one-time programmable memory elements is in the second keyed configuration, and the third location of one-time programmable memory elements is in the third keyed configuration.

Example 11. The method of examples 1 to 10, wherein the first valid configuration corresponds to a first product lifecycle of the system on a chip, the second valid configuration corresponds to a second product lifecycle of the system on a chip, and the third valid configuration corresponds to a third product lifecycle of the system on a chip.

Example 12. The method of examples 1 to 11 further including decoding the set of one-time programmable memory elements and the programming indicator.

Example 13. The method of examples 1 to 12, wherein the first product lifecycle of the system on a chip includes a manufacturer testing cycle, the second product lifecycle of the system on a chip includes an in-field lifecycle, and the third product lifecycle includes a failure-analysis lifecycle.

Example 14. The method of examples 1 to 13 further including programming the set of one-time programmable memory elements to the second valid configuration.

Example 15. A system on a chip including a set of one-time programmable memory elements that includes: a first valid configuration; a second valid configuration; and a plurality of invalid configurations. The system on a chip further including: a programming indicator initially having a first value and configured to be permanently set to a second value; a decoder circuit in communication with the set of one-time programmable memory elements to determine whether the set of one-time programmable memory elements is in the first valid configuration, the second valid configuration, or any one of the plurality of invalid configurations; and wherein the decoder circuit generates a threat-detection signal when the set of one-time programmable memory elements is in any of the plurality of invalid configurations when the programming indicator is permanently set to the second value.

Example 16. The system on a chip of example 15, wherein the programming indicator includes a one-time programmable memory element.

Example 17. The system on a chip of examples 15 or 16, wherein the decoder includes a hardware finite state machine.

Example 18. The system on a chip of examples 15-17, wherein the decoder circuit generates an interrupt signal when the set of one-time programmable memory elements is in the second valid configuration and the programming indicator is set to the first value.

Example 19. The system on a chip of examples 15-18 further including a central processing unit in communication with the decoder circuit and configured to receive the interrupt signal.

Example 20. The system on a chip of examples 15-19 further including a fault collector circuit configured to receive the interrupt signal.

Example 21. The system on a chip of examples 15-20, further including a programming circuit in communication with the set of one-time programmable memory elements and configured to program the set of one-time programmable memory elements.

Example 22. The system on a chip of examples 15-21, wherein a first one-time programmable element of the one-time programmable elements includes an electrical fuse one-time programmable element.

Example 23. The system on a chip of examples 15-22, wherein a first one-time programmable element of the one-time programmable elements includes an anti-fuse one-time programmable element.

Example 24. The system on a chip of examples 15-23, wherein a first one-time programmable element of the one-time programmable elements includes a laser-fuse one-time programmable element.

Example 25. The system on a chip of examples 15-24, wherein the programing indicator includes a triple voted bit.

Example 26. The system on a chip of examples 15-25, wherein the set of one-time programmable memory includes a third valid configuration.

Example 27. The system on a chip of examples 15-26, wherein the set of one-time programmable memory elements includes: a first location of the set of one-time programmable memory elements that includes a first keyed configuration and a plurality of first invalid-keyed configurations; a second location of the set of one-time programmable memory elements that includes a second keyed configuration and a plurality of second invalid-keyed configurations; and a third location of the set of one-time programmable memory elements that includes a third keyed configuration and a plurality of third invalid-keyed configurations.

Example 28. The system on a chip of examples 15-27, wherein the set of one-time programmable memory elements is in the first valid configuration when the first location of the set of one-time programmable memory elements is in the first keyed configuration, the second location of the set of one-time programmable memory elements is in any one of the plurality of second invalid-keyed configurations, and the third location of the set of one-time programmable memory elements is in any one of the plurality of third invalid-keyed configurations; the set of one-time programmable memory elements is in the second valid configuration when the first location of the set of one-time programmable memory elements is in any one of the plurality of first invalid-keyed configurations, the second location of the set of one-time programmable memory elements is in the second keyed configuration, and the third location of the set of one-time programmable memory elements is in any one of the plurality of third invalid-keyed configurations; and the set of one-time programmable memory elements is in the third valid configuration when the first location of the set of one-time programmable memory elements is in any one of the plurality of first invalid-keyed configurations, the second location of the set of one-time programmable memory elements is in the second keyed configuration, and the third location of the set of one-time programmable memory elements is in the third keyed configuration.

Example 29. A system on a chip including: a set of one-time programmable memory elements that includes: a first valid configuration; a second valid configuration; a third valid configuration and a plurality of invalid configurations wherein the set of one-time programmable memory elements is in the first valid configuration when a first location of the set of one-time programmable memory elements is in a first keyed configuration, a second location of the set of one-time programmable memory elements is in any one of a plurality of second invalid-keyed configurations, and a third location of the set of one-time programmable memory elements is in any one of a plurality of third invalid-keyed configurations. The set of one-time programmable memory elements is in the second valid configuration when the first location of the set of one-time programmable memory elements is in any one of a plurality of first invalid-keyed configurations, the second location of the set of one-time programmable memory elements is in a second keyed configuration, and the third location of the set of one-time programmable memory elements is in any one of the plurality of third invalid-keyed configurations. The set of one-time programmable memory elements is in the third valid configuration when the first location of the set of one-time programmable memory elements is in any one of the plurality of first invalid-keyed configurations, the second location of the set of one-time programmable memory elements is in the second keyed configuration, and the third location of the set of one-time programmable memory elements is in a third keyed configuration. The system on a chip further including a programming indicator initially including a first value and configured to be permanently set to a second value wherein the programming indicator is a one-time programmable memory element; a decoder circuit including a hardware finite state machine in communication with the set of one-time programmable memory elements to determine whether the set of one-time programmable memory elements is in the first valid configuration, the second valid configuration, or any one of the plurality of invalid configuration; and wherein the decoder circuit generates a threat-detection signal when the set of one-time programmable memory elements is in any of the plurality of invalid configurations when the programming indicator is permanently set to the second value.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for operating a system on a chip, the method comprising:
   having a set of one-time programmable memory elements, the set comprising a first valid configuration, a second valid configuration, and a plurality of invalid configurations;
   having a programming indicator set to a first value before the set of one-time programmable memory elements is programmed, the programming indicator used to detect a programming state of the set of one-time programmable memory elements;

programming the set of one-time programmable memory elements to the first valid configuration, a value of the programming indicator being independent of an initial configuration of the set of one-time programmable memory elements;

permanently setting the programming indicator to a second value in response to the set of one-time programmable memory elements leaving the first valid configuration;

detecting a security threat to the system on a chip in response to the programming indicator being set to the second value and the set of one-time programmable memory elements being set to an invalid configuration of the plurality of invalid configurations:

setting a security level of the system on a chip to a first security level in response to the programming indicator being in the first value;

setting the security level of the system on a chip to a second security level in response to the set of one-time programmable memory elements being in the second valid configuration; and generating an interrupt signal in response to the programming indicator being set to the first value and the set of one-time programmable memory elements being in the second valid configuration.

2. The method of claim 1, further comprising, resetting the system on a chip in response to the detecting the security threat.

3. The method of claim 1, further comprising having the programming indicator comprise a bit of one-time programmable memory, and wherein permanently setting the programming indicator to a second value comprises programming the bit of one-time programmable memory.

4. The method of claim 1, wherein the second security level comprises a heightened security level with respect to the first security level.

5. The method of claim 1, wherein the set of one-time programmable memory elements is programmable into a third valid configuration and the method further comprises:

setting the security level of the system on a chip to a third security level in response to the set of one-time programmable memory elements being in the third valid configuration.

6. The method of claim 5, wherein the third security level comprises a heightened security level with respect to the first security level.

7. The method of claim 5, wherein the set of one-time programmable memory elements comprises:

a first location of one-time programmable memory elements that comprises a first keyed configuration and a plurality of first invalid-keyed configurations;

a second location of one-time programmable memory elements that comprises a second keyed configuration and a plurality of second invalid-keyed configurations; and a third location of one-time programmable memory elements that comprises a third keyed configuration and a plurality of third invalid-keyed configurations.

8. The method of claim 7, wherein the set of one-time programmable memory elements is in the first valid configuration in response to the first location of one-time programmable memory elements being in the first keyed configuration, the second location of one-time programmable memory elements being in any one of the plurality of second invalid-keyed configurations, and the third location of one-time programmable memory elements being in any one of the plurality of third invalid-keyed configurations;

wherein the set of one-time programmable memory elements is in the second valid configuration in response to the first location of one-time programmable memory elements being in any one of the plurality of first invalid-keyed configurations, the second location of one-time programmable memory elements being in the second keyed configuration, and the third location of one-time programmable memory elements being in any one of the plurality of third invalid-keyed configurations; and wherein the set of one-time programmable memory elements is in the third valid configuration in response to the first location of one-time programmable memory elements being in any one of the plurality of first invalid-keyed configurations, the second location of one-time programmable memory elements being in the second keyed configuration, and the third location of one-time programmable memory elements being in the third keyed configuration.

9. The method of claim 8, wherein the first valid configuration corresponds to a first product lifecycle of the system on a chip, the second valid configuration corresponds to a second product lifecycle of the system on a chip, and the third valid configuration corresponds to a third product lifecycle of the system on a chip.

10. The method of claim 9, further comprising decoding the set of one-time programmable memory elements and the programming indicator.

11. The method of claim 9, wherein the first product lifecycle of the system on a chip comprises a manufacturer testing cycle, the second product lifecycle of the system on a chip comprises an in-field lifecycle, and the third product lifecycle comprises a failure-analysis lifecycle.

12. The method of claim 9, further comprising programming the set of one-time programmable memory elements to the second valid configuration.

13. A system on a chip comprising:

a set of one-time programmable memory elements, each one-time programmable memory element comprising a first valid configuration, a second valid configuration, and a plurality of invalid configurations;

a programming indicator initially comprising a first value and configured to be permanently set to a second value, the programming indicator used to detect a programming state of the set of one-time programmable memory elements; and a decoder circuit in communication with the set of one-time programmable memory elements, the decoder circuit configured to:

determine whether the set of one-time programmable memory elements is in the first valid configuration, the second valid configuration, or any one of the plurality of invalid configurations, generate a threat-detection signal in response to: the set of one-time programmable memory elements being in any of the plurality of invalid configurations and the programming indicator being permanently set to the second value set a security level of the system on a chip to a first security level in response to the programming indicator being in the first value, set the security level of the system on a chip to a second security level in response to the set of one-time programmable memory elements being in the second valid configuration, and generate an interrupt signal in response to the programming indicator being set to the first value and the set of one-time programmable memory elements being in the second valid configuration.

14. The system on a chip of claim 13, wherein the programming indicator comprises a one-time programmable memory element.

15. The system on a chip of claim 13, wherein the decoder circuit comprises hardware finite state machine.

16. The system on a chip of claim 13, further comprising a central processing unit in communication with the decoder circuit and configured to receive the interrupt signal.

17. The system on a chip of claim 13, further comprising a fault collector circuit configured to receive the interrupt signal.

18. The system on a chip of claim 13, further comprising a programming circuit in communication with the set of one-time programmable memory elements and configured to program the set of one-time programmable memory elements.

19. The system on a chip of claim 13, wherein a first one-time programmable element of the set of one-time programmable elements comprises an electrical fuse one-time programmable element.

20. The system on a chip of claim 13, wherein a first one-time programmable element of the set of one-time programmable elements comprises an anti-fuse one-time programmable element.

21. The system on a chip of claim 13, wherein a first one-time programmable element of the set of one-time programmable elements comprises a laser-fuse one-time programmable element.

22. The system on a chip of claim 13, wherein the programing indicator comprises a triple voted bit.

23. The system on a chip of claim 13, wherein the set of one-time programmable memory comprises a third valid configuration.

24. The system on a chip of claim 23, wherein the set of one-time programmable memory elements comprises:
a first location of the set of one-time programmable memory elements comprising a first keyed configuration and a plurality of first invalid-keyed configurations;
a second location of the set of one-time programmable memory elements comprising a second keyed configuration and a plurality of second invalid-keyed configurations;
and a third location of the set of one-time programmable memory elements comprising a third keyed configuration and a plurality of third invalid-keyed configurations.

25. The system on a chip of claim 24, wherein the set of one-time programmable memory elements is in the first valid configuration in response to the first location of the set of one-time programmable memory elements being in the first keyed configuration, the second location of the set of one-time programmable memory elements being in any one of the plurality of second invalid-keyed configurations, and the third location of the set of one-time programmable memory elements being in any one of the plurality of third invalid-keyed configurations,
wherein the set of one-time programmable memory elements is in the second valid configuration in response to the first location of the set of one-time programmable memory elements being in any one of the plurality of first invalid-keyed configurations, the second location of the set of one-time programmable memory elements being in the second keyed configuration, and the third location of the set of one-time programmable memory elements being in any one of the plurality of third invalid-keyed configurations, and
wherein the set of one-time programmable memory elements is in the third valid configuration in response to the first location of the set of one-time programmable memory elements being in any one of the plurality of first invalid-keyed configurations, the second location of the set of one-time programmable memory elements being in the second keyed configuration, and the third location of the set of one-time programmable memory elements being in the third keyed configuration.

26. A system on a chip comprising:
a set of one-time programmable memory elements comprising a first valid configuration, a second valid configuration, a third valid configuration, and a plurality of invalid configurations,
wherein the set of one-time programmable memory elements is in the first valid configuration in response to a first location of the set of one-time programmable memory elements being in a first keyed configuration, a second location of the set of one-time programmable memory elements being in any one of a plurality of second invalid-keyed configurations, and a third location of the set of one-time programmable memory elements being in any one of a plurality of third invalid-keyed configurations,
wherein the set of one-time programmable memory elements is in the second valid configuration in response to the first location of the set of one-time programmable memory elements being in any one of a plurality of first invalid-keyed configurations, the second location of the set of one-time programmable memory elements being in a second keyed configuration, and the third location of the set of one-time programmable memory elements being in any one of the plurality of third invalid-keyed configurations, and
wherein the set of one-time programmable memory elements is in the third valid configuration in response to the first location of the set of one-time programmable memory elements being in any one of the plurality of first invalid-keyed configurations, the second location of the set of one-time programmable memory elements being in the second keyed configuration, and the third location of the set of one-time programmable memory elements being in a third keyed configuration;
a programming indicator initially comprising a first value and configured to be permanently set to a second value, wherein the programming indicator comprises a one-time programmable memory element, wherein the programming indicator is used to detect a programming state of the set of one-time programmable memory elements; and
a decoder circuit comprising a hardware finite state machine in communication with the set of one-time programmable memory elements, the decoder circuit configured to:
determine whether the set of one-time programmable memory elements is in the first valid configuration, the second valid configuration, or any one of the plurality of invalid configuration, and
generate a threat-detection signal in response to the set of one-time programmable memory elements being in any of the plurality of invalid configurations and the programming indicator being permanently set to the second value, set a security level of the system on a chip to a first security level in response to the programming indicator being in the first value, set the security level of the system on a chip to a second security level in response to the set of one-time programmable memory elements being in the second valid configuration, and generate an interrupt signal in response to the programming indicator being set to the first value and the set of one-time programmable memory elements being in the second valid configuration.

27. The system on a chip of claim 13, further comprising a programming circuit in communication with the set of one-time programmable memory elements and configured to program the set of one-time programmable memory elements.

28. The system on a chip of claim 13, wherein a first one-time programmable element of the set of one-time programmable elements comprises an electrical fuse one-time programmable element or an anti-fuse one-time programmable element.

29. The system on a chip of claim 13, wherein the set of one-time programmable memory comprises a third valid configuration, wherein the set of one-time programmable memory elements comprises:

a first location of the set of one-time programmable memory elements comprising a first keyed configuration and a plurality of first invalid-keyed configurations;

a second location of the set of one-time programmable memory elements comprising a second keyed configuration and a plurality of second invalid-keyed configurations;

and a third location of the set of one-time programmable memory elements comprising a third keyed configuration and a plurality of third invalid-keyed configurations.

* * * * *